(12) United States Patent
Corso

(10) Patent No.: US 7,923,642 B2
(45) Date of Patent: Apr. 12, 2011

(54) FLEXIBLE MAGNETIZATION ENERGY TRANSFER RIBBONS AND PROCESS FOR PRODUCING THEM

(75) Inventor: François Corso, Virieu le Grand (FR)

(73) Assignee: Delachaux S. A., Gennevilliers (FR)

( * ) Notice: Subject to any disclaimer, the term of this patent is extended or adjusted under 35 U.S.C. 154(b) by 187 days.

(21) Appl. No.: 12/375,004

(22) PCT Filed: Jul. 27, 2007

(86) PCT No.: PCT/EP2007/057741
§ 371 (c)(1),
(2), (4) Date: Jan. 23, 2009

(87) PCT Pub. No.: WO2008/012353
PCT Pub. Date: Jan. 31, 2008

(65) Prior Publication Data
US 2009/0314543 A1    Dec. 24, 2009

(30) Foreign Application Priority Data
Jul. 27, 2006 (FR) ...................................... 06 06877

(51) Int. Cl.
*H01B 7/00* (2006.01)
(52) U.S. Cl. ............ 174/117 R; 174/117 F; 174/117 FF
(58) Field of Classification Search .............. 174/110 R, 174/113 R, 117 R, 117 F, 117 FF
See application file for complete search history.

(56) References Cited

U.S. PATENT DOCUMENTS

| 3,229,030 | A | | 1/1966 | Baermann |
| 3,544,192 | A | * | 12/1970 | Goldstein ..................... 385/121 |
| 4,652,772 | A | * | 3/1987 | Shephard ...................... 307/147 |
| 4,678,864 | A | * | 7/1987 | Cox .................................. 174/36 |
| 5,003,126 | A | * | 3/1991 | Fujii et al. ........................ 174/36 |
| 5,446,239 | A | * | 8/1995 | Mizutani et al. ................ 174/36 |
| 7,105,746 | B2 | * | 9/2006 | Shimura .................... 174/72 A |

FOREIGN PATENT DOCUMENTS

| FR | 2 865 860 A3 | 8/2005 |
| WO | WO 2005/083724 A1 | 9/2005 |

* cited by examiner

*Primary Examiner* — William H Mayo, III
(74) *Attorney, Agent, or Firm* — Blakely, Sokoloff, Taylor & Zafman LLP

(57) ABSTRACT

A flexible energy-transfer ribbon that includes a magnetized-tape (3) composed of an elastomer material forming a matrix in which are embedded particles that impart to it a permanent magnetism oriented in the direction of the thickness of the said tape. At least one energy-transfer device (2) lies along the support tape, and a coating material (1) in which the (or each) energy-transfer device is embedded adheres to the magnetized tape. The magnetized tape is subdivided into successive sections of such a length that dimensional changes induced in the magnetized tape, in particular under the effect of temperature differences, induce stresses between the magnetized tape and the coating material which are sufficiently small to prevent weakening of the adhesion between the magnetized tape and the coating material.

17 Claims, 2 Drawing Sheets

FLEXIBLE MAGNETIZATION ENERGY TRANSFER RIBBONS AND PROCESS FOR PRODUCING THEM

The present patent application is a Utility claiming the benefit of Application No. PCT/EP2007/057741, filed Jul. 27, 2007.

BACKGROUND OF THE INVENTION

1. Field of the Invention

This present invention concerns a flexible energy-transfer ribbon, that includes a longitudinal flexible support tape that is permanently magnetized, and at least one longitudinal flexible energy-transfer device, which is held by the said tape so as to at least prevent any relative transverse movement.

2. Description of Related Art

People frequently have recourse to a flexible ribbon, which may or may not be permanently magnetized, in many technical areas and using various methods of implementation, when what is required is a transfer of energy (including signals of course) between localized zones of two solids, where these zones are mobile in relation to each other.

Different flexible ribbon structures, and also different possible applications, are described in a detailed manner in the foreword and in the description of document WO 2005/083724 A1, in the name of the Applicant, to which reference will be made as required.

The use of such known flexible ribbons has considerable advantages in many applications, as mentioned in the aforementioned document.

One particular example of such a ribbon includes a series of energy-transfer devices embedded in the mass of a fixing agent such as a resin, with the assembly thus obtained being fixed onto one face of a support tape made, for example, from an elastomer material loaded with magnetic particles.

It appears that the behavior of such a ribbon in a context of temperature changes gives rise to problems.

More precisely, it appears that the assembly composed of energy-transfer devices embedded in the resin mass can become detached from the support tape, as a result of the essentially shear stresses that appear between the two. More precisely, it is thought that when the material of the support tape, which is typically an elastomer of the EPDM type (Ethylene Propylene Diene Rubber) incorporating ferrite grains, is exposed to high temperatures of the order of 50 to 80°, the molecules of this material organize themselves so as to create a significant, no-reversible swaging effect. In these conditions, the forces of adhesion between the assembly formed from the devices embedded in the resin and the support tape are not sufficient to prevent separation of the two, and the ribbon becomes unusable.

BRIEF SUMMARY OF THE INVENTION

This present invention aims to overcome these drawbacks of past designs, and to propose a new ribbon with magnetic support tape for energy-transfer devices or other types of attachment that avoid this problematic behavior while still preserving materials and processes of similar manufacture, and therefore without increasing the production cost of the ribbon.

To this end, and according to a first aspect of the invention, a flexible energy-transfer ribbon is proposed that includes a magnetized tape composed of an elastomer material forming a matrix in which are embedded particles that impart to it a permanent magnetism oriented in the direction of the thickness of the said tape, with at least one energy-transfer device lying along the support tape, and a coating material in which the (or each) energy-transfer device is embedded and which adheres to the magnetized tape, characterised in that the magnetized tape is subdivided into successive sections of such a length that dimensional change phenomena induced in the magnetized tape, in particular under the effect of temperature differences, induce stresses between the magnetized tape and the coating material which are sufficiently small to prevent weakening of the adhesion between the said magnetized tape and the said coating material.

According to a second aspect of the invention, a flexible energy-transfer ribbon is proposed that includes a magnetized tape composed of an elastomer material forming a matrix in which are embedded particles that impart to it a permanent magnetism oriented in the direction of the thickness of the said tape, with at least one energy-transfer device lying along the magnetized tape, and a coating material in which the (or each) energy-transfer device is embedded, and adhering to the magnetized tape, characterised in that the magnetized tape is a continuous magnetized tape in which are formed points of weakness spaced at distances such that dimensional change phenomena induced in the magnetized tape, in particular under the effect of temperature differences, induce stresses between the magnetized tape and the coating material that are sufficiently strong to provoke the rupture of the magnetized tape at the location of the said points of weakness and to form sections of tape, but which are sufficiently small to prevent weakening of the adhesion between the said magnetized tape and the said coating material;

Certain preferred but not limiting aspects of these ribbons are specified below:
- the coating material is an organic resin;
- the coating material adheres directly to the magnetized tape, or indeed is attached to the magnetized tape by means of an adhesive;
- the magnetized tape is composed of a matrix of ethylene propylene diene monomer (EPDM) rubber in which ferrite grains are embedded;
- the ribbon includes a magnetized tape on either side of the coating material enclosing the device or devices;
- the sections of one magnetized tape are offset in relation to the sections of the magnetized tape opposite (3), so that their respective breaks do not coincide;
- the sections have a length of between about 3 mm and about 15 mm, preferably between about 4 mm and 10 about 7 mm.

Finally, according to a third aspect of the invention, a process is proposed for the manufacture of a flexible energy-transfer ribbon, characterised in that it includes the following stages:
- provision of a continuous magnetized tape composed of an elastomer material forming a matrix in which are embedded particles that impart to it a permanent magnetism oriented in the direction of the thickness of the said tape,
- fixing along the said tape of at east one energy-transfer device by means of a coating material in which the (or each) energy-transfer device is embedded and which adheres to the magnetized tape,
- creation, in the said magnetized tape, of notches forming points of weakness spaced at distances such that dimensional change phenomena induced in the magnetized tape, in particular under the effect of temperature differences, induce stresses between the magnetized tape and the coating material that are sufficiently strong to provoke the rupture of the tape at the location of the said points of weakness and to form sections of tape, but which are sufficiently small to prevent weakening of the adhesion between the said magnetized tape and the said coating material.

Advantageously, the process includes a later stage that consists of exposing the assembly simultaneously to a temperature that leads to a dimensional-change phenomenon and to bending stresses, so as to convert the said notches forming points of weakness into breaks separating the sections.

BRIEF DESCRIPTION OF THE DRAWINGS

Other aspects, aims and advantages of this present invention will appear more clearly on reading the following detailed description of preferred forms of implementation of the latter, provided by way of a non-limiting example and with reference to the appended drawings, in which.

DETAILED DESCRIPTION OF THE INVENTION

Figure 1:
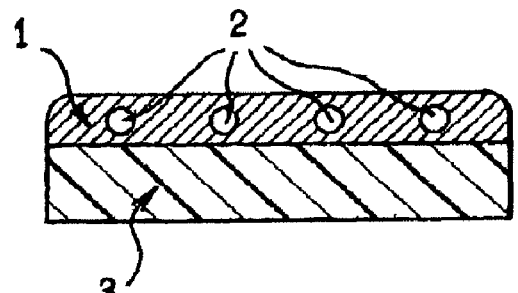
FIG. 1 is a view in cross section of a ribbon according to a first form of implementation of the invention.
Figure 2:
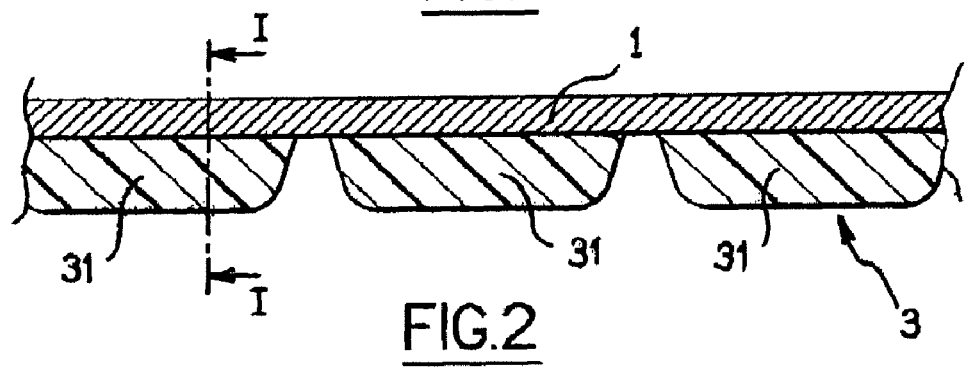
FIG. 2 is a view in longitudinal section of the ribbon of FIG. 1, showing the section line I-I used for FIG. 1.

Referring firstly to FIGS. 1 and 2, a ribbon according to the invention is of generally rectangular cross-section, whose width (measured horizontally in FIG. 1) is greater than its thickness (measured vertically in this same figure).

The ribbon thus has one favored bending direction, in a longitudinal plane perpendicular to its major faces.

The ribbon according to the invention has a support-forming tape 3 that is permanently magnetized in the direction of its thickness. This permanent magnetization can be in the same direction over the whole of the width, this being preferable in the case where this width is relatively small, of the order of less than one millimeter to two or three millimeters for example, but it can also be in alternating directions spread over the width, which may be preferable for greater widths.

The ribbon also includes a multiplicity of energy-transfer devices 2 embedded in the common mass 1 of coating material composed, for example, of organic resin such as an ultraviolet-cured acrylic resin.

The energy transferred by means of the transfer devices 2 can be chosen from a group that includes energies of a light, electrical, pneumatic, hydraulic, and funicular nature. In the present example, the energy-transfer devices are optical fibers.

In any event, those skilled in the art can choose between various methods of practical implementation of the ribbon 1 that are available in order to provide the permanent magnetization wanted.

The tape 3 is composed, for example, from a matrix of ethylene propylene diene monomer (EPDM) rubber in which ferrite grains are embedded. Typically, one would have about 90% by weight of ferrite in order to provide a high magnetization level.

The energy-transfer devices 2, such as optical fibers, can be of conventional manufacture, as long as their bending characteristics are compatible with the applications envisaged for the ribbon.

For more details on the possible implementations, reference will be made document WO 2005/083724 A1 as mentioned earlier.

FIG. 1 illustrates the case of a ribbon according to the invention that includes four sheathed optical fibers 2 placed side-by-side in the coating material 1, associated with a single magnetized tape 3.

The thickness of the coating material 1 is chosen to be greater than the external diameter of each of the devices 2, in order to preserve the continuity of this material 1 along the face of the ribbon opposite to the tape 3 as well as along the face of the ribbon on the side of the tape 3.

According to an essential aspect of this present invention, and as shown in FIG. 2, the support tape 3 is periodically interrupted in a localized manner, thus creating a succession of magnetic sections 31 separated from each other. The overall cohesion of the ribbon is partly ensured in this case by the coating material 1 itself, which is then chosen and dimensioned to have the desired mechanical properties.

As a result, when a temporary or permanent dimensional change phenomenon occurs relatively between the support tape 3 and the coating material 1, shear forces are generated between the two materials which are insufficient to result in separation of the two. Typically, such stresses can come from a molecular reorganization that leads to a swaging effect when the EPDM material is raised to high temperatures, typically between 60 and 80° C.

In fact, at each break between the individual sections 31, such stresses are released since then only the coating material 1 remains, apart from the devices 2 themselves.

Figure 3:
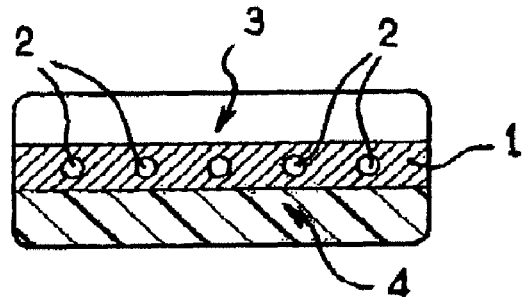
FIG. 3 is a view in cross section of a ribbon according to a second form of implementation of the invention.
Figure 4:
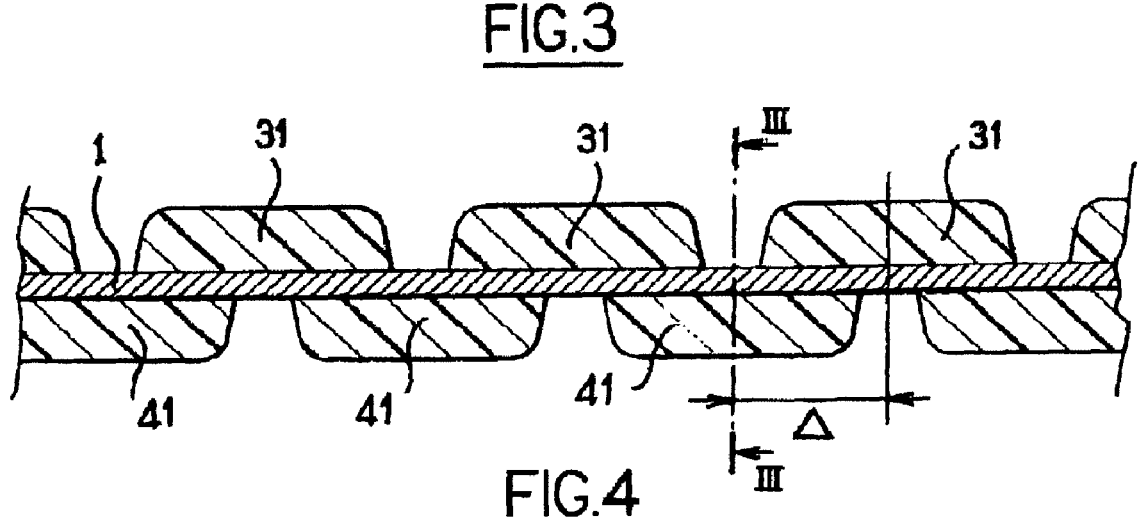
FIG. 4 is a view in longitudinal section of the ribbon of FIG. 1, showing the section line III-III used for FIG. 3, and FIGS. 5A to 5D illustrate, in the form longitudinal sections, the different stages of an example of a process for the manufacture of a ribbon according to the invention.

FIGS. 3 and 4 illustrate a second form of implementation of the invention in which the support tape 3 is doubled into two tapes support 3, 4 located on either side of the ribbon of coating material 1 enclosing the devices 2, here numbering five.

As before, each support tape 3, 4 is broken so as to form individual sections respectively 31 and 41. Advantageously, these breaks are offset from each other by a distance Δ (see FIG. 4) in such a way that the breaks between sections located on one do not coincide with the breaks between sections on the other side, and preferably so that a break between two sections on a tape is located more-or-less opposite to the middle of a section of the tape on the opposite side in the longitudinal direction of the ribbon. As a result, one avoids the creation of weak points in the ribbon, corresponding to the presence of the coating material 1 alone, in the event that the latter may not have all of the mechanical properties required.

Furthermore, such an arrangement pith the double support ape improves the behavior of the ribbon, with the level of magnetization being substantially the same on its two faces.

An example of a process for the manufacture of a ribbon according to the invention will now be described, with reference to FIGS. 5A to 5C.

Figure 5A:
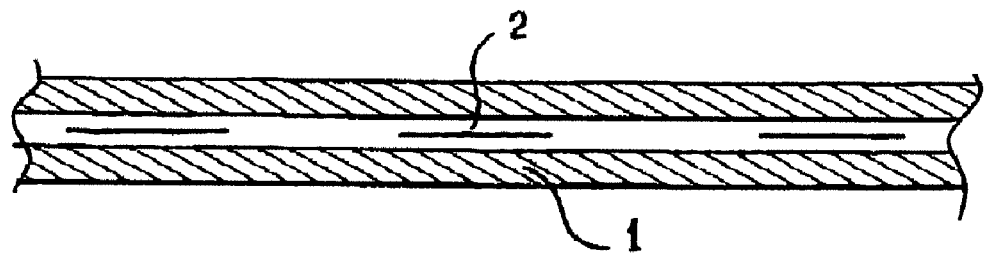
Figure 5B:
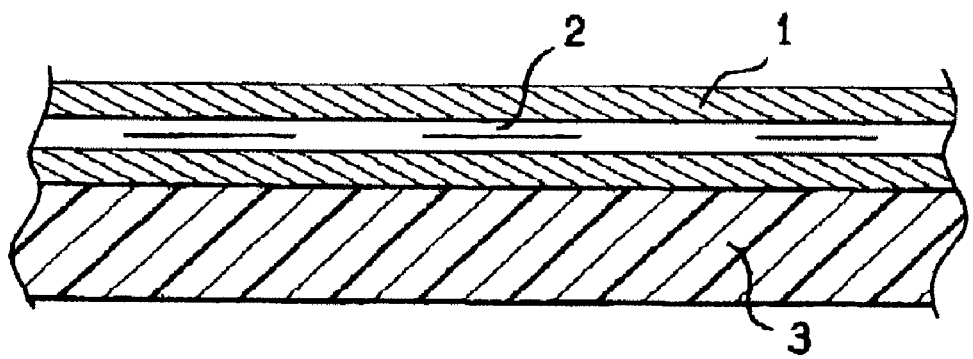

We begin by preparing a set of devices 2 embedded in their coating material 1 so as to form a ribbon (FIG. 5A).

Along this ribbon (either directly, in an adhesive state of the material 1, or by means of a separate adhesive), a continuous, magnetized, support tape 3 is then glued, composed of EPDM loaded with ferrite grains (FIG. 5B), as explained earlier.

Figure 5C:
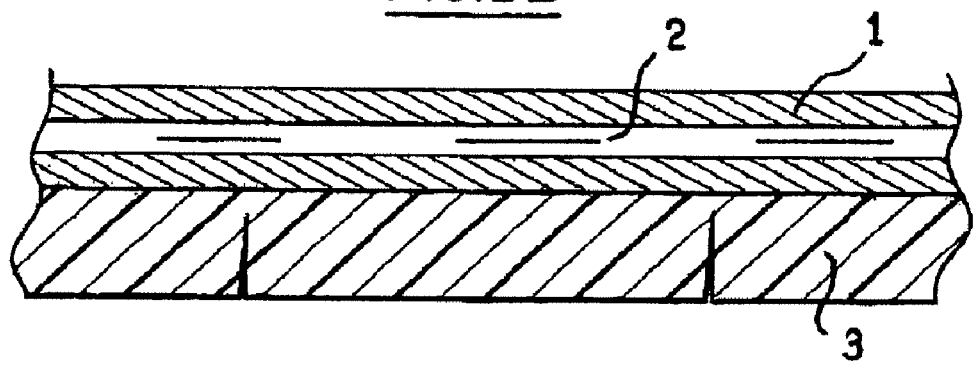

The next stage consists of using a blade or similar device to create notches E in the thickness of the tape 3, or preferably only in a substantial part of its thickness, so as not to risk damaging the coating material 1 enclosing the devices 2 (FIG. 5C).

These notches, each of which creates a point of weakness in the support tape, are preferably separated by a distance of between 3 and 15 mm, and preferably around 4 to 7 mm. Here they are spaced by 5 mm.

Figure 5D:
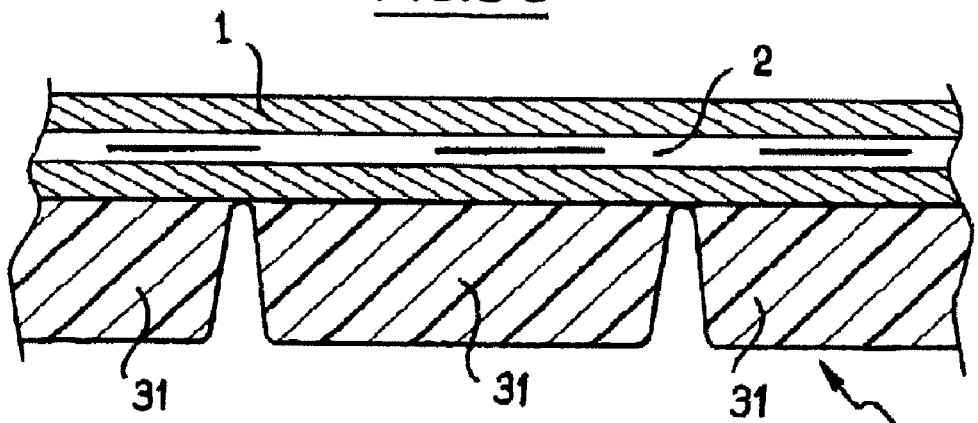

The next stage consists of exposing the assembly thus created to a temperature of the order of 60 to 80° C. for a period of about 2 to 4 hours, and at the same time submitting it to bending stresses close to those that the ribbon will encounter in service, so as to provoke the swaging effect of the EPDM comprising the support tape 3. This swaging effect can reach about 10%, and it can be seen that the notched zones will therefore widen, to reach about 0.5 mm in width, thereby separating the individual sections 31 of the tape (FIG. 5d).

Since this swaging effect is permanent, any later exposure of the ribbon to high temperatures during use will not lead to greater forces on the latter that might result in detachment of the assembly 1, 2 in relation to the sections 31 that together form the support tape.

The process described above can easily be transposed, by those skilled in the art, for the manufacture of a ribbon according to FIGS. 3 and 4.

It is naturally intended that many variants of this process can also be envisaged while still remaining within the scope of this present invention.

In particular, it is possible to subdivide the support tapes or tapes into sections according to any pattern, whether regular or not, including in the direction of the width of the ribbon when the width of the latter is such that dimensional change phenomena in this direction can be harmful.

In addition, the invention applies from the moment when any cause, whatever its nature, is liable to induce stresses between the support tape or tapes and the coating material.

The invention claimed is:

1. A flexible energy-transfer ribbon that includes a magnetized tape (3) composed of an elastomer material forming a matrix in which are embedded particles that impart to it a permanent magnetism oriented in the direction of the thickness of the said tape, at least one energy-transfer device (2) lying along the support tape, and a coating material (1) in which the (or each) energy-transfer device is embedded and which adheres to the magnetized tape, characterised in that the magnetized tape is subdivided into successive sections (31) of such a length that dimensional change phenomena induced in the magnetized tape, in particular under the effect of temperature differences, induce stresses between the magnetized tape and the coating material which are sufficiently small to prevent weakening of the adhesion between the said magnetized tape and the said coating material.

2. A flexible energy-transfer ribbon, that includes a magnetized tape (3) composed of an elastomer material forming a matrix in which are embedded particles that impart to it a permanent magnetism oriented in the direction of the thickness of the said tape, at least one energy-transfer device (2) lying along the magnetized tape, and a coating material (1) in which the (or each) energy-transfer device is embedded and which adheres to the magnetized tape, characterised in that the magnetized tape is a continuous magnetized tape (3) in which are formed points of weakness (E) spaced at distances such that dimensional change phenomena induced in the magnetized tape, in particular under the effect of temperature differences, induce stresses between the magnetized tape and the coating material that are sufficiently strong to provoke the separation of the magnetized tape at the location of the said points of weakness and the formation of sections of tape (31), but which are sufficiently small to prevent weakening of the adhesion between the said magnetized tape and the said coating material.

3. A ribbon according to claim 1, characterised in that the coating material (1) adheres directly, to the magnetized tape.

4. A ribbon according to claim 1, characterised in that the coating material (1) is attached to the magnetized tape by means of an adhesive.

5. A ribbon according to claim 1, characterised in that the magnetized tape (3) is composed of a matrix of ethylene propylene diene monomer (EPDM) rubber in which ferrite grains are embedded.

6. A ribbon according to claim 1, characterised in that it includes a magnetized tape (3, 4) on either side of the coating material enclosing the device or devices.

7. A ribbon according to claim 6, characterised in that the sections (31) of one magnetized tape (3) are offset in relation to the sections (41) of the magnetized tape opposite (3), so that their respective breaks do not coincide.

8. A ribbon according to claim 1, characterised in that the sections (31, 41) have a length of between about 3 mm and about 15 mm, and preferably between about 4 mm and about 7 mm.

9. The flexible ribbon according to claim 1 or 2, characterised in that the coating material (1) is an organic resin.

10. A process for the manufacture of a flexible energy-transfer ribbon, characterised in that it includes the following stages:
provision of a continuous magnetized tape (3) composed of an elastomer material forming a matrix in which are embedded particles that impart to it a permanent magnetism oriented in the direction of the thickness of the said tape,
fixing along the said tape of at least one energy-transfer device (2) by means of a coating material (1) in which the (or each) energy-transfer device is embedded and which adheres to the magnetized tape,
creation in the said magnetized tape of notches (E) forming points of weakness spaced at distances such that dimensional change phenomena induced in the magnetized tape, in particular under the effect of temperature differences, induce stresses between the magnetized tape and the coating material that are sufficiently strong to provoke the rupture of the tape at the location of the said points of weakness and to form sections of tape (31), but which are sufficiently small to prevent weakening of the adhesion between the said magnetized tape and the said coating material.

11. The process according to claim 10, characterised in that the coating material (1) is an organic resin.

12. The process according to either of claims 10 and 11, characterised in that the coating material (1) adheres directly to the magnetized tape.

13. The process according to claim 10, characterised in that the coating material (1) is attached to the magnetized tape by means of an adhesive.

14. The process according to claim 10, characterised in that the magnetized tape (3) is composed of a matrix of ethylene propylene diene monomer (EPDM) rubber in which ferrite grains are embedded.

15. The process according to claim 10, characterised in that it also includes the fixing of another magnetized tape (4) to the coating material, on the side opposite to the first magnetized tape, with notches forming points of weakness also being created in the said other magnetized tape.

16. The process according to claim 10, characterised in that the tape sections (31, 41) have a length of between about 3 mm and about 15 mm, and preferably between about 4 mm and about 7 mm.

17. The process according to claim 1 or claim 10, characterised in that it includes a later stage that consists of exposing the assembly simultaneously to a temperature that leads to a dimensional-change phenomenon and to bending stresses, so as to convert the said notches (E) forming points of weakness into breaks separating the sections (31; 31, 41).

* * * * *